Patented Feb. 9, 1926.

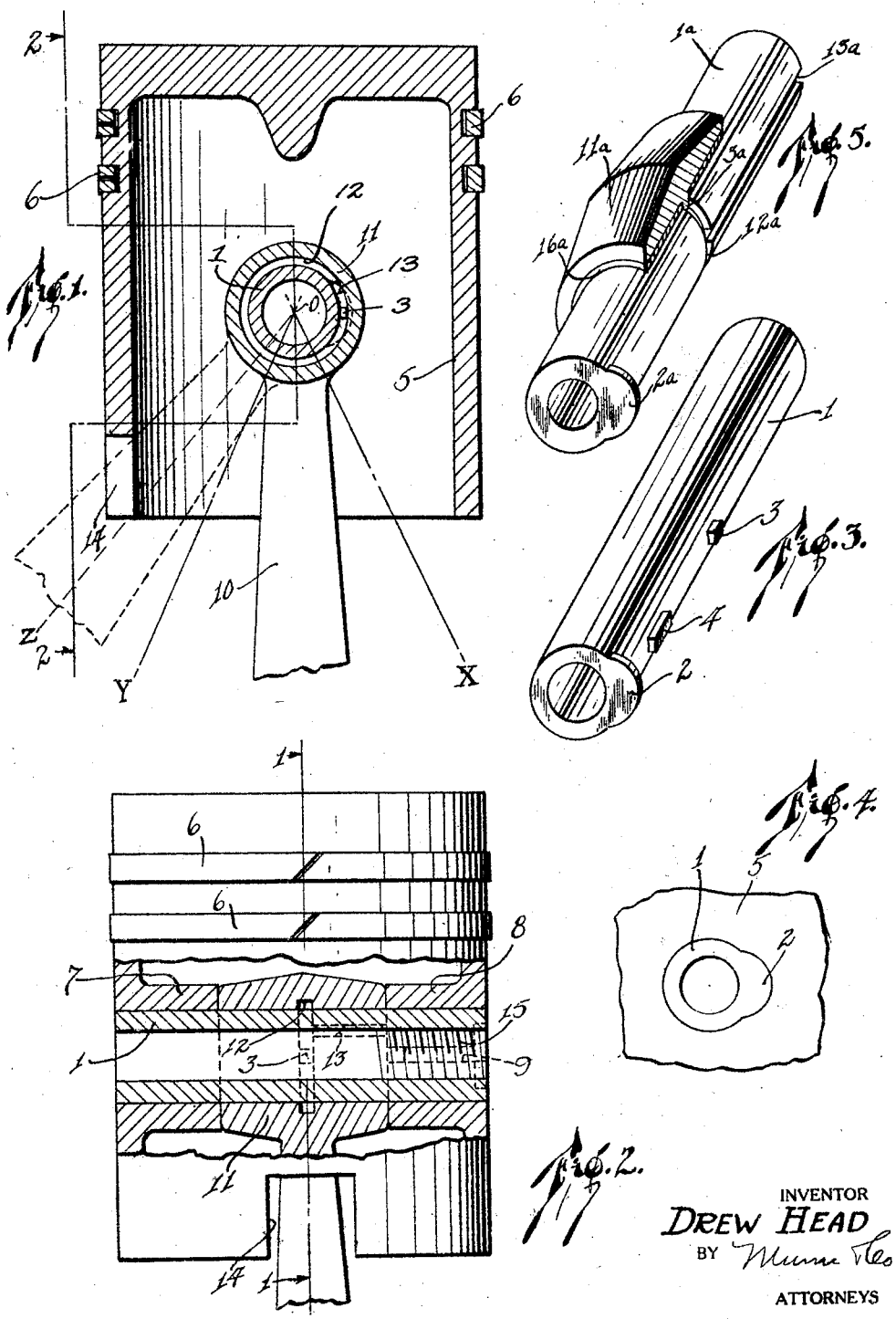

1,572,795

UNITED STATES PATENT OFFICE.

DREW HEAD, OF CHICAGO, ILLINOIS.

WRIST-PIN CONNECTION.

Application filed May 25, 1925. Serial No. 32,671.

*To all whom it may concern:*

Be it known that I, DREW HEAD, a citizen of the United States, and a resident of Chicago, in the county of Cook and State of Illinois, have invented a new and useful Improvement in Wrist-Pin Connections, of which the following is a full, clear, and exact description.

My invention relates to improvements in wrist pin connections for pistons, and it consists in the combinations, constructions and arrangements herein described and claimed.

An object of my invention is to provide a wrist pin connection which obviates the necessity of the use of set screws, but which will positively prevent a longitudinal movement or a rotative movement of the wrist pin with respect to the piston.

A further object of my invention is to provide a device by means of which a wrist pin may be quickly inserted in place and the connecting rod attached thereto, and in which, when the connecting rod is moved to a normal operating position, the wrist pin will be positively locked in position.

A further object of my invention is to provide a simple but positive locking means for preventing a rotative or longitudinal movement of the pin, and at the same time to permit free movement of the connecting rod on the wrist pin, while dispensing with the use of additional elements, such as cotter pins, bolts, nuts, lock washers, removable keys, or other similar elements.

Other objects and advantages will appear in the following specification, and the novel features of the invention will be particularly pointed out in the appended claims.

My invention is illustrated in the accompanying drawings, forming part of this application, in which Figure 1 is a section along the line 1—1 of Figure 2, Figure 2 is a section along the line 2—2 of Figure 1, Figure 3 is a perspective view of the wrist pin, Figure 4 is a fragmentary view of a portion of the piston wall, and Figure 5 is a modified form of construction.

In carrying out my invention, I provide a wrist pin 1 of the shape shown in Figure 3. It will be observed that this wrist pin is hollow and is provided at one end with a flange or extension 2. Near the central portion of the pin is a lug 3, while in alinement with the lug 3 and between it and the flange 2 is a second lug 4.

The piston is shown in general at 5. It is provided with the usual piston rings 6, and has two inwardly projecting bosses 7 and 8 respectively. The boss 8 is provided with a groove 9, which extends from the outside to the inner edge thereof.

The connecting rod 10 is provided with a head 11 having a bore arranged to receive the wrist pin 1, and is provided at its central portion with an internal annular groove 12. It has also a groove 13 extending at right angles thereto, which is the same size as the groove 9, and which, as shown later, is adapted to be brought into registration with the groove 9. In Figure 2 the groove 13 appears to be of smaller diameter than the groove 9, but it will be understood that this is because the edges of the groove 9, as viewed in Figure 2, are equally distant from the observer, while one edge of the groove 13 is further away, owing to the position of the head of the connecting rod.

From the foregoing description of the various parts of the device, the operation thereof may be readily understood. In assembling the parts, the head 11 of the connecting rod 10 is placed between the bosses 7 and 8, and the connecting rod is swung to the dotted line position shown in Figure 1. In order to permit this, I provide a cut-away portion 14 in the skirt of the piston, where the skirt is of such length as to prevent the abnormal movement of the connecting rod. On pistons having a short skirt, this may not be necessary. When the connecting rod is swung to the position shown in dotted lines in Figure 1, the groove 13 will be brought into registration with the groove 9. The wrist pin 1 may then be passed through the boss 8, through the head 11, and into the boss 7, the lugs 3 and 4 passing into the registering grooves 9 and 13. The outer piston wall is provided with a countersunk recess of the shape of the extension or flange 2, so as to limit the inward movement of the wrist pin, and also to prevent a rotative movement of the wrist pin with respect to the boss. When the flange 2 has been seated in its recess, the lug 3 will have attained a position in registration with the annular groove 12 in the head 11 of the connecting rod. When now the connecting rod is brought into a normal operating position by rotating it on the wrist pin, the groove 13 will be out of registration with the groove 9 and also with the lug 3, which is now in the annular groove. This locks the wrist pin from longitudinal movement in either direction, while at the same time it permits the head 11 to turn freely with respect to the wrist pin.

In Figure 1, I have shown lines X—O and Y—O. These represent the extreme movements of the central axis of the connecting rod to either side, while the dotted line Z—O represents the abnormal movement when the wrist pin is being inserted. It will therefore be seen that during the normal movement or while the connecting rod is fastened to the crank shaft (not shown), it will be impossible for the lug 3 to get out of the groove 12, or to come into registration with the groove 13. The wrist pin is therefore firmly locked by the lug 3 against longitudinal movement, and by the flange 2 against rotative movement. The lug 4 also forms an additional locking means to prevent rotation of the wrist pin with respect to the boss, and aids in taking the strain off from the flange 2.

It will be noted that the wrist pin 1 is threaded at 15 for the purpose of inserting a tool with a threaded end, whereby the pin may be removed when desired.

Instead of grooving the boss and the head of the connecting rod, I may use a construction such as that shown in Figure 5, in which the wrist pin 1ª is provided with a groove 13ª which intersects a centrally disposed groove 12ª. The head 11ª of the connecting rod is provided with a lug 3ª, which is arranged to travel in the groove 12ª. Either of the forms shown may be used with or without bearing sleeves, such as that shown at 16ª in Figure 5.

In the form shown in Figure 5, the connecting rod is swung to the dotted line position, such as that shown in Figure 1, and in this position the wrist pin is pushed inwardly through the boss, the lug 3ª passing through the groove 13ª until the central groove 12ª is reached. The flange 2ª will enter the recess so as to prevent the pin from rotating, and then when the connecting rod is brought to a normal working position, the parts will be locked in position, so as to prevent longitudinal or rotative movement of the pin, while permitting free oscillation of the connecting rod head with respect to the pin.

I claim:

1. In a device of the type described, a connecting rod having a bore, a wrist pin adapted to pass through said bore, and interengaging means on said connecting rod and said wrist pin for preventing a longitudinal movement of the pin with respect to the connecting rod in any of the operative positions of said connecting rod, and for permitting rotative movement of the connecting rod with respect to the wrist pin.

2. The combination of a piston, a connecting rod, said piston and said connecting rod having alined bores, of a wrist pin arranged to enter said alined bores, means carried by said wrist pin and arranged to engage the piston for preventing rotative movement of the wrist pin with respect to the piston, and interengaging means on said wrist pin and said connecting rod for preventing the longitudinal movement of the wrist pin, while permitting a rotative movement of the connecting rod with respect to the wrist pin.

3. The combination with a piston having inwardly projecting bosses, a connecting rod having a head adapted to enter between said bosses, said bosses and said head having alined bores, a wrist pin arranged to enter the alined bores, means carried by the wrist pin for engaging the piston to prevent rotation of the wrist pin, and a lug and groove connection between said head and said pin for preventing the longitudinal movement of the pin, while permitting a rotative movement of said head with respect to the pin.

4. A piston having a pair of inwardly extending bosses, one of said bosses being provided with a recess and having an internal longitudinal groove, a connecting rod having a head provided with an internal annular groove and having a longitudinally extending groove arranged to register with the groove in the boss when the head is in an abnormal position, a wrist pin having a lug arranged to pass through the alined grooves and having a flange arranged to enter the recess in said boss for preventing the rotation of the pin with respect to the piston, the lug on the pin being disposed so as to register with the annular groove in the head when the pin is in operative position, whereby the pin is prevented from longitudinal movement and the head is permitted a rotative movement when the head is in a normally operative position.

DREW HEAD.